Patented Sept. 27, 1949

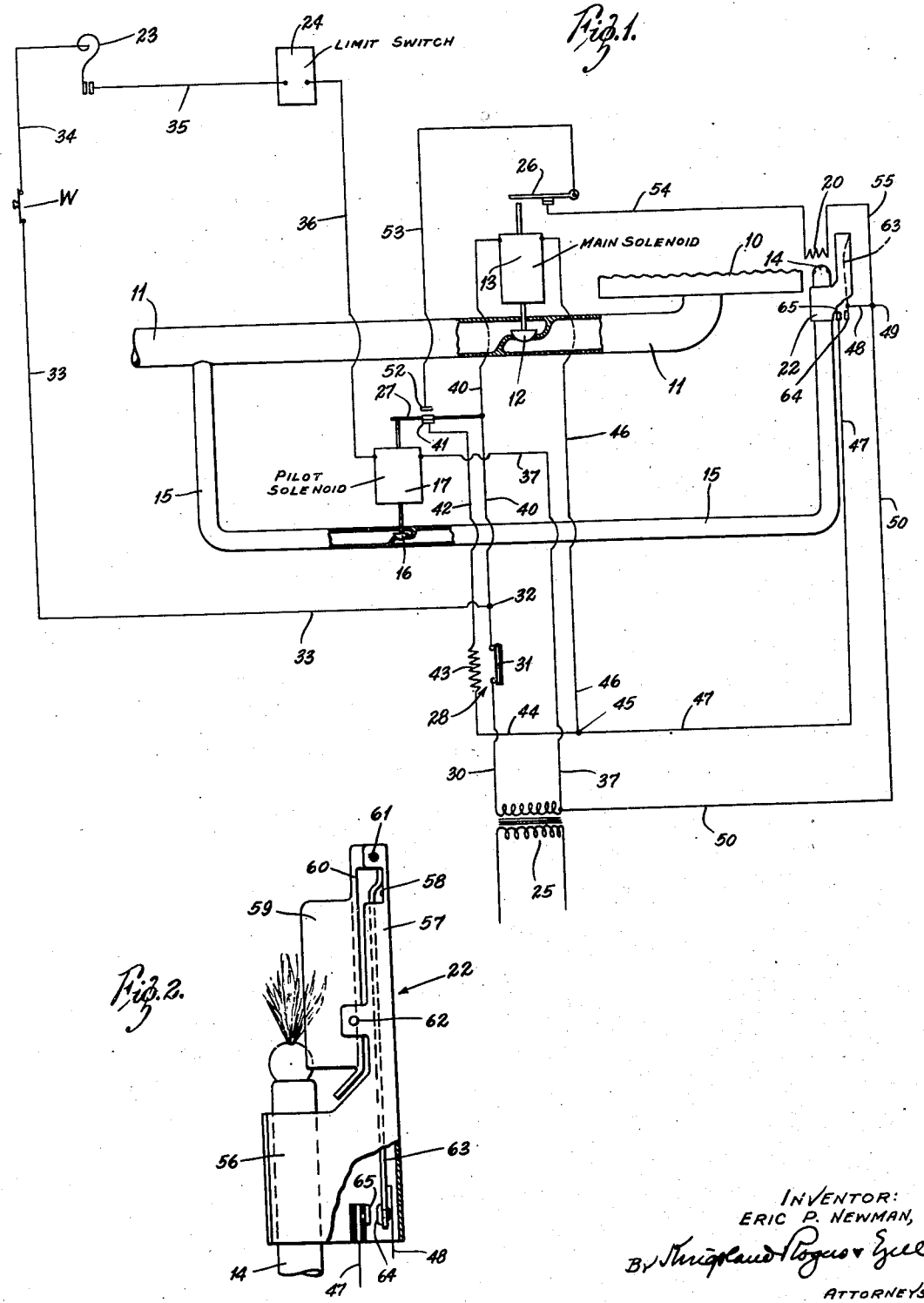

2,483,298

UNITED STATES PATENT OFFICE 2,483,298

SAFETY CONTROL SYSTEM FOR BURNERS

Eric P. Newman, Clayton, Mo., assignor, by mesne assignments, to Missouri Automatic Control Corporation, a corporation of Missouri Application December 29, 1944, Serial No. 570,326

8 Claims. (Cl. 158—117.1)

The present invention relates to a control mechanism, primarily for fuel supply devices, and most particularly to a burner control having a pilot operation under overall regulation by a space thermostat.

It is a primary object of the invention to provide a control for main and pilot line valves, wherein the main valve operation is always under control of, and operated by, a pilot flame safety switch.

A particular object of the invention is to provide a control wherein cycling of the room or space thermostat, normally or rapidly, between open and closed positions, cannot produce a dangerous condition, and more particularly cannot open the main valve while the combustion safety switch is in a false position.

It is an object of the invention to provide a control which opens a pilot line upon demand for heat, starts an igniter, then, upon establishment of the pilot flame, cuts off the igniter and establishes fuel flow through a main fuel burner line. It is a further object to provide a safety means that stops fuel supply upon failure of a flame safety switch in hot position.

In the drawings:

Fig. 1 is a diagrammatic view of the device, showing the wiring and the burner parts schematically; and Fig. 2 is a view of the type of pilot flame switch preferably used.

The main fuel burner 10 receives fuel, such as gas, through a fuel line 11, in which is interposed a main fuel valve 12 operated by a solenoid coil 13. There is a pilot burner 14 fed by a pilot line 15, in which a pilot valve 16 is interposed. The pilot valve 16 is controlled by a pilot solenoid 17, and the pilot line 15 connects with the main fuel line 11 ahead of the valve 12.

An igniting device 20, here shown in the form of a resistance heater, is disposed adjacent the pilot burner 14 to ignite gas emitting therefrom. Also adjacent the pilot burner 14 is a pilot safety 22, shown in greater detail in Fig. 2.

The overall regulation of the control is provided by a room thermostat 23 disposed in the space in which the temperature is to be controlled. A conventional limit switch 24 is also employed. Power is obtained from a transformer 25.

The main solenoid 13 also operates a switch 26, opening the same when the coil 13 is energized and closing it when the coil is released. The coil 17 operates a single pole, double throw switch 27 to move it from one closing position to its other closing position when the coil 17 is energized. A heat relay 28 is employed as a safety means, as will appear. A summer-and-winter switch W is provided for deenergizing the circuit in the summer time.

The first circuit, starting from the left of the secondary of the transformer 25, includes a line 30 leading through the bimetallic switch element 31 of the heat relay 28, thence to a junction point 32. From the junction 32, a line 33 leads to the summer-winter switch W, whence a line 34 leads to the room thermostat 23. From the room thermostat, a line 35 leads to the limit switch 24, from which a line 36 leads to the coil 17 of the pilot solenoid. A line 37 extends from the pilot solenoid to the other side of the transformer.

The junction point 32 is also connected by a line 40, into which the switch blade 27 is connected. The line 40 also leads to the coil 13 of the main solenoid.

The switch blade 27, in its released position, closes with a contact 41 in a line 42 leading to the heater 43 of the heat relay 28. From the heater 43, the line 44 leads to a junction 45.

The other side of the main solenoid coil 13 is also connected by a line 46 with the junction 45. From the junction 45, a line 47 is connected into the flame switch 22, which is open in the absence of a pilot flame. From the other flame switch contact, a line 48 connects to a junction point 49, from which a line 50 returns to the secondary.

The other contact 52 of the pilot solenoid switch 27 is connected by a line 53 to the switch 26 of the main solenoid, which is closed when the solenoid is released. From the switch 26, a line 54 leads to the igniter 20, and from it a line 55 leads to the junction point 49.

The flame safety is open when the pilot flame is extinguished. It is of the type shown in copending application, Serial No. 540,372, filed June 15, 1944, by this inventor now become Patent Number 2,407,438, granted September 10, 1946. Its principles may be illustrated by reference to Fig. 2. It includes a first member 56 in the form of base secured to the pilot burner 14. This base has an upwardly projecting part 57 of channel section, except for a limited cutaway portion 58. A second part 59 is channel-shaped except for a cut-away portion 60 adjacent the top, to provide wings to contain the pilot flame and restrict passage of heat therefrom to the member 57. The two members 57 and 59 are rigidly attached at spaced points 61 and 62 on each side. A switch blade 63 is rigidly attached to the member 57 at the top thereof, and extends downwardly where its contact 64 may be moved against the fixed contact 65, by warpage of the member 57, such as to rock the attached upper end of the switch blade 63.

When the pilot flame impinges upon the wings 59, it expands the member 58. However, the member 56, being exposed to ambient air, never becomes as hot as the member 58 when the latter is subjected to flame, owing to the very poor conductivity between the two. Hence, the member 59 expands to a greater degree than the member 57. Being rigidly attached between the two points 61 and 62, the two members will warp at their cut-away portions 58 and 60 and twist the upper end of the switch blade to throw its lower end in position to close the contacts 64 and 65.

Changes in ambient temperature do not affect this flame safety switch. They act equally on both members, which, being of the same material, expand in like degree for ambient changes. When the pilot flame is extinguished, the member 58 rapidly contracts to open the switch contacts, which action is always rapid despite high ambient temperatures, because the direct immersion of the member 59 in the pilot flame always causes it to be heated much higher than any ambient temperatures to be expected.

Operation

At the start, the control will be in the positions shown in Fig. 1 with both burners extinguished. When the room thermostat 23 closes its switch, power will be introduced from the secondary of the transformer 25 through the line 30, the normally closed switch 31, the junction 32, the line 33, the switch 28, the line 34, the thermostat 23, the line 35, the limit switch 24, the line 36 through the pilot solenoid coil 17, and by a line 37 back to the secondary. This will immediately energize the pilot solenoid coil to open the pilot valve 16 and to shift the switch 27 into closure with the contact 52, while opening its closure with the contact 41. Thereupon, an additional circuit will be made from the junction 32 by the line 40, through the switch 27, the contact 52, the line 53, the switch 26, the line 54, the igniter 20, the line 55, the junction 49, and the line 50 back to the secondary. Thus, as soon as the pilot valve is opened, the igniter will be energized and will ignite gas emitting from the pilot burner 14.

At this time, the main burner valve is closed because the circuit to the coil 13 is open at the safety switch 22. However, promptly after the pilot flame ignites, the safety switch 22 closes. Thereupon, a circuit will be established from the secondary through the lines 30 and 40 to the coil 13, thence by the line 46, the junction 45, the line 47 through the switch 22, by a line 48, the junction 49, and back to the secondary by the line 50. Energization of the main solenoid coil 13 will open the main valve 12, admitting fuel to the main burner 10 which is ignited by the pilot flame, and it also opens the switch 26, cutting off the igniter 29.

The foregoing condition will exist until the thermostat is satisfied and opens. When it opens, it breaks the circuit to the pilot solenoid coil 17, so that the pilot valve immediately closes, shutting off the pilot flame, and the switch 27 drops to close with the contact 41. When the pilot flame is extinguished, the flame switch 22 opens, and this breaks the circuit through the main solenoid coil 13, so that the main valve closes, shutting off the main burner.

When the switch 27 closes with the contact 41 under the foregoing circumstances while the flame switch remains closed, it also closes the circuit through the safety relay 28 which is established from the secondary through the line 30, the line 40, the switch 27, the line 42, the heater 43, the line 44, and the line 47 through the safety switch, and back to the secondary. The flame safety switch 22 should open within a few seconds after the pilot flame is extinguished. As long as it remains closed after the pilot solenoid is released, heat is developed in the heater 43, so that, if for any reason the flame safety 22 fails to open within a reasonable time, the switch 31 will be opened and all of the circuits broken at this point.

If at any time power fails, the control will effect a safe condition. If power fails during the starting interval before the main valve has been opened, and before the flame safety 22 is closed, the pilot solenoid will release the valve 16 to closed position, thus cutting off all gas flow. Upon restoration of power, the cycle will start from the beginning. If power fails during a running period, after the pilot flame has been established, and after the flame safety switch 22 is closed and the main solenoid energized to open the main valve, all of the valves will close. When power is restored, the pilot solenoid will again be energized, and the main coil 13 will be reenergized, re-supplying fuel to both burners. However, the pilot safety switch 22 will open almost immediately, breaking the circuit to the main burner coil and closing the main burner valve. Thereupon, the igniter circuit will again be closed by closure of the switch 26, and ignition of the pilot flame may be produced. The flame safety 22 will reclose after production of the pilot flame, so that the main burner valve will reopen.

In case of flame failure during a running period, the flame safety switch 22 will promptly open, releasing the coil 13, closing the main valve 12, and restarting the igniter. Thereupon the pilot flame will be reignited, the safety switch 22 will reclose, and the main valve again reopened.

If the room thermostat fails to open, the control will run on the limit switch 22, which will break the room thermostat circuit when the limiting temperature is exceeded.

At the end of any cycle wherein the safety switch 22 has opened, an immediate recycle can begin without danger. In other controls, the flame or combustion safety switch is not in direct control of the main valve, and an immediate recycle by return of the room thermostat to heat demanding position (or a jiggling of the thermostat) may start a new cycle before the safety switch 22 has returned to safe position. As the main burner is not extinguished by the present control until the safety switch 22 is in safe position, an immediate recycle cannot produce a dangerous condition.

What is claimed is:

1. In a control system for use with a main fuel line for a main burner and a pilot fuel line for a pilot burner, a main valve for the main fuel line and a space thermostat, electrical means for operating the main valve, a pilot valve for the pilot line and electrical means for operating it, an igniter for the pilot burner, circuit means for energizing the pilot valve operating means when the thermostat demands heat, means interconnected with the pilot valve and rendered operative by operation thereof to energize the igniter to ignite the pilot burner, means including a flame-responsive switch operated in response to existence of a pilot flame, to energize the main valve operating means and means responsive to said main valve operating means for deenergizing the igniter.

2. In a control system for use with a main fuel line for a main burner and a pilot fuel line for a pilot burner, a main valve for the main fuel line and a space thermostat, electrical means for operating the main valve, a pilot valve for the pilot line and electrical means for operating it, an igniter for the pilot burner, circuit means for energizing the pilot valve operating means when the thermostat demands heat, means actuated upon energization of said circuit means to energize the igniter to ignite the pilot burner, means including a flame-responsive switch operated in response to existence of a pilot flame, to actuate the main valve operating means, means operable by said main valve operating means to deenergize the igniter, and safety means operated upon release of the pilot valve operating means to insure closure of the main valve upon closure of the pilot valve regardless of failure of the flame switch.

3. In a control system for use with a main fuel line for a main burner and a pilot fuel line for a pilot burner, a main valve for the main fuel line and a space thermostat, electrical means for operating the main valve, a pilot valve for the pilot line and electrical means for operating it, an igniter for the pilot burner, circuit means for energizing the pilot valve operating means when the thermostat demands heat, means actuated upon energization of said circuit means to energize the igniter to ignite the pilot burner, means including a flame-responsive switch operated in response to existence of a pilot flame, to energize the main valve operating means, means actuated by said valve operating means to deenergize the igniter, and safety means operated upon release of the pilot valve operating means to insure closure of the main valve upon closure of the pilot valve regardless of failure of the flame switch, said safety means including a relay and an operating circuit therefor established when the pilot valve is closed and the flame switch is closed.

4. In a control system for use with a main fuel line for a main burner and a pilot fuel line for a pilot burner, a main valve for the main fuel line and a space thermostat, electrical means for operating the main valve, a pilot valve for the pilot line and electrical means for operating it, an igniter for the pilot burner, circuit means for energizing the pilot valve operating means when the thermostat demands heat, means actuated upon energization of said circuit means to energize the igniter to ignite the pilot burner, means including a flame-responsive switch operated in response to existence of a pilot flame, to energize the main valve operating means, means operable to deenergize the igniter, and safety means operated upon release of the pilot valve operating means to insure closure of the main valve upon closure of the pilot valve regardless of failure of the flame switch, said safety means including a relay and an operating circuit therefor established when the pilot valve is closed and the flame switch is closed, said relay being normally slower in action than the flame switch.

5. In a burner control for use with main and pilot burners, a main burner valve, a pilot burner valve, means operated in response to existence of flame at the pilot, means to open the pilot valve upon demand for heat from the main burner and to close the same upon absence of demand, means operated by operation of the pilot valve opening means to ignite the pilot whereby the same may act upon the flame-responsive means, means operated in response to operation of the flame-responsive means to open the main burner valve, said means being separate from the pilot valve opening means, whereby when the latter closes the pilot valve the main burner may operate until the pilot burner flame-responsive means becomes inoperative, and then stop.

6. In a burner control for use with main and pilot burners, a main burner valve, a pilot burner valve, means to open and close the pilot burner valve, pilot flame-responsive means operated from a first to a second position upon existence of a pilot flame, means including the flame-responsive means but otherwise normally independent of the pilot valve opening means, for operating the main valve opening means to open the main valve when the flame-responsive means is in second position, and to release the main valve operating means when the flame-responsive means is in first position, and timing means rendered operative by closure of the pilot valve with the flame-responsive means in its second position to prevent unlimited operation of the main burner when the pilot valve is closed.

7. In a burner control, a main burner operating means, a pilot burner, a pilot burner valve operating means, means to actuate the pilot burner operating means for producing a pilot flame, a pilot flame-responsive switch movable from first to second position upon existence of pilot flame, a first circuit for the main valve operating means including the flame-responsive switch in second position, second circuit means energized when the pilot burner operating means is in inoperative position and the flame-responsive switch is in second position, and a relay device including a relay switch in the first circuit means and a relay actuating means in the second circuit means.

8. In a burner control, a main burner operating means, a pilot burner, a pilot burner valve operating means, means to actuate the pilot burner operating means for producing a pilot flame, a pilot flame-responsive switch movable from first to second position upon existence of pilot flame, a first circuit for the main valve operating means including the flame-responsive switch in second position, second circuit means energized when the pilot burner operating means is in inoperative position and the flame-responsive switch is in second position, and a relay device including a relay switch in the first circuit means and a relay actuating means in the second circuit means, said relay device comprising a time delay mechanism in which the relay switch is opened after energization of the relay actuating means for a predetermined time.

ERIC P. NEWMAN.

REFERENCES CITED

The following references are of record in the file of this patent:

UNITED STATES PATENTS

| Number | Name | Date |
| --- | --- | --- |
| 1,492,117 | Barrows et al. | Apr. 29, 1924 |
| 1,582,190 | Payne | Apr. 27, 1926 |
| 1,970,942 | Payne | Aug. 21, 1934 |

(Other references on following page)

UNITED STATES PATENTS

| Number | Name | Date |
|---|---|---|
| 2,005,224 | Dunham et al. | June 18, 1935 |
| 2,012,503 | Gauger | Aug. 27, 1935 |
| 2,015,318 | Schnepp et al. | Sept. 24, 1935 |
| 2,119,503 | Kriechbaum | May 31, 1938 |
| 2,138,796 | Sparrow | Nov. 29, 1938 |
| 2,170,497 | Gille | Aug. 22, 1939 |
| 2,192,631 | Beam | Mar. 5, 1940 |
| 2,200,908 | Beggs | May 14, 1940 |
| 2,260,977 | Jones | Oct. 28, 1941 |
| 2,269,157 | Levine | Jan. 6, 1942 |
| 2,275,657 | Wetzel | Mar. 10, 1942 |
| 2,286,156 | Petersen | June 9, 1942 |
| 2,291,805 | Denison | Aug. 4, 1942 |
| 2,295,455 | Dillman | Sept. 8, 1942 |
| 2,304,641 | Jones | Dec. 8, 1942 |
| 2,327,690 | Ackerman | Aug. 24, 1943 |
| 2,371,020 | Beam | Mar. 6, 1945 |